March 17, 1964 L. F. DAY 3,125,643

MULTIPLE REPERTORY DIALING TELEPHONE SYSTEM

Filed Feb. 2, 1962 3 Sheets-Sheet 1

INVENTOR:
LUTHER F. DAY

BY: Fraser and Bogucki

ATTORNEYS

March 17, 1964 L. F. DAY 3,125,643

MULTIPLE REPERTORY DIALING TELEPHONE SYSTEM

Filed Feb. 2, 1962 3 Sheets-Sheet 2

INVENTOR:
LUTHER F. DAY

BY: Fraser and Bogucki

ATTORNEYS

MULTIPLE REPERTORY DIALING TELEPHONE SYSTEM

Filed Feb. 2, 1962 3 Sheets-Sheet 3

INVENTOR:
LUTHER F. DAY
BY Fraser and Bogucki
ATTORNEYS

United States Patent Office 3,125,643
Patented Mar. 17, 1964

3,125,643

MULTIPLE REPERTORY DIALING TELEPHONE SYSTEM

Luther F. Day, Hawthorne, Calif., assignor, by mesne assignments, to Atlantic Research Corporation, Fairfax, Va., a corporation of Virginia Filed Feb. 2, 1962, Ser. No. 170,726
17 Claims. (Cl. 179—90)

This invention relates generally to telephone systems of the automatic dial type and, in particular, relates to a multiple repertory dialing apparatus for such a telephone system.

A repertory dialing telephone system permits the calling of frequently used telephone numbers without the necessity of consulting a telephone directory or address list to look up the telephone number of the called party. In other words, by setting a selector to correspond to the listing of a selected subscriber and by generating a start signal, the train of pulses indicative of the subscriber's number can be automatically dialed with resulting savings in time and effort. Also such automatic dialing of a number is usually faster than manual operation of a telephone dial by the user and is without the possibility of errors encountered when a number is dialed manually.

For various reasons, such dial pulse transmitters of the repertory dialing type have not found general acceptance in the past. Some of these systems are relatively complicated and hence expensive to install and maintain. Others, while simpler in construction and less expensive, have the drawback that the dial pulse generator which generates the train of dial pulses must be located near the telephone instrument. Such a dial pulse generator may be rather bulky and consequently takes up considerable space. It is, therefore, difficult to find the required space for an enclosure housing the dial pulse generator near the telephone instrument in a home or office. In some of the previously suggested prior art repertory dial pulse transmitters, the coded means, such as disks, which generate the trains or sets of dial pulses of a called number are directly and manually operated by the operator. Hence, it would be difficult to adapt such a system to a business office where many extension telephones may be connected to one telephone line. Other previously known repertory dialing systems have included the feature of automatic repertory dialing at the expense of conventional dial operation. Thus, while automatic dialing was achieved with respect to a particular telephone instrument, it was impossible to dial any numbers which were not included in the repertory. Furthermore, those previously developed repertory dialing systems which are known provided repertory dialing for a single line only. In consequence, a separate such system is required for each separate telephone line, thus making the cost of providing such service prohibitive for most telephone subscribers.

An important requirement of a repertory dialing telephone system is that it should be possible to replace the coded means so that obsolete subscriber's call numbers can be removed and new ones added as the need arises without having to call on telephone company service personnel. Also it is particularly desirable that the inclusion of the automatic repertory dialing feature not interfere with the normal dialing function of the telephone set. If this cannot readily be provided, the repertory dialing apparatus is of limited value to the average home subscriber or small business office.

It is accordingly an object of the present invention to provide an improved repertory dialing apparatus for use with an automatic dial telephone system wherein the dial pulse generator may be remotely located with respect to the telephone instrument and may be remotely controlled therefrom.

Another object of the present invention is to provide an improved repertory dialing apparatus having coded disks which can be readily encoded by the user or which can be easily replaced or removed.

A further object of the present invention is to provide a repertory dialing apparatus of the type referred to which permits remote control by each of several extension telephones on one telephone line and which also permits manual selection of the desired call number from each extension telephone.

It is another object of the present invention to provide a repertory dialing apparatus for a telephone system which is capable of use with a considerable number of individual subscriber lines in order to reduce substantially the cost of providing repertory dialing service to each subscriber.

Still another object of the present invention is to provide a repertory dialing apparatus which is versatile, yet simple and inexpensive, and which permits a repertory of a large number of subscriber's call numbers.

An important object of this invention is the provision of a repertory dialing apparatus which is compatible with existing central office systems and which may be used in conjunction with existing telephone instruments without interfering with the conventional operation thereof.

In accordance with the present invention there is provided a repertory dialing apparatus for an automatic dialing telephone system of the type having a telephone instrument and a telephone line circuit associated with each individual subscriber. The repertory dialing apparatus includes a selectively operable dial pulse generator having a plurality of coded elements. The coded elements, may, for example, be disks having projecting teeth on their circumference suitably arranged to generate a set or train of dial pulses corresponding to the call number of a selected subscriber. In its more general application, the repertory dialing apparatus comprises two distinct portions, the aforementioned dial pulse generator and one or more remote control selector units. The dial pulse generator may, in accordance with an aspect of the invention, be placed in a location remote from the telephone instrument. When employed on a common basis with a plurality of individual subscriber lines, the dial pulse generator may be located at some common terminal point for the respective lines. In such an application, the apparatus is provided, in accordance with further aspects of the invention, with suitable circuitry for applying the generated dial pulse train to the appropriate telephone line and for preventing other users of the same equipment from changing the selection of a particular coded element during the brief interval that the pulse generator is operated in conjunction with a particular line. Furthermore the pulse generator may if desired be simplified in accordance with the invention to provide repertory dialing telephone service for a single subscriber's line, in which case the apparatus may be placed in a location remote from the telephone instrument and may be remotely controlled from the instrument itself or from a number of telephone instruments connected as extension telephones to a single line. Alternatively, if desired, the entire apparatus may be connected to the telephone circuit adjacent the individual instrument.

Manually operable control means such as a selector mechanism is located near the individual telephone instrument and is coupled to the pulse generator for selecting a desired coded element to generate a train of dial pulses corresponding to the call number of the subscriber to be called. In accordance with the invention, each subscriber line is provided with a bridging circuit or line circuit interrupter for completing the telephone line circuit while the pulse generator is not in operation. This makes it possible to obtain the dial tone and to complete a call after the dial pulses have been transmitted, as well as permitting a call to be dialed via the telephone instrument dial in the conventional manner. Each individual selector mechanism may be provided, in accordance with an aspect of the invention, with a remotely controlled clearance arrangement which is used to clear the selector settings of other selector mechanisms and is arranged to prevent one subscriber from inadvertently interfering with the operation of the pulse generator apparatus while it is being used by another subscriber.

The pulse generator apparatus of one particular arrangement of the invention includes a disk driving means such as a synchronous electric motor which is utilized for rotating the group of coded disks through one complete cycle at a suitable speed for generating the dial pulses at a rate which is acceptable to the over-all telephone system.

A better understanding of the invention may be had from a consideration of the following detailed description, taken in conjunction with the accompanying drawings, in which like elements are designated by the same reference characters, and wherein.

Figures 1, 2, 3, 4, 8, 9:
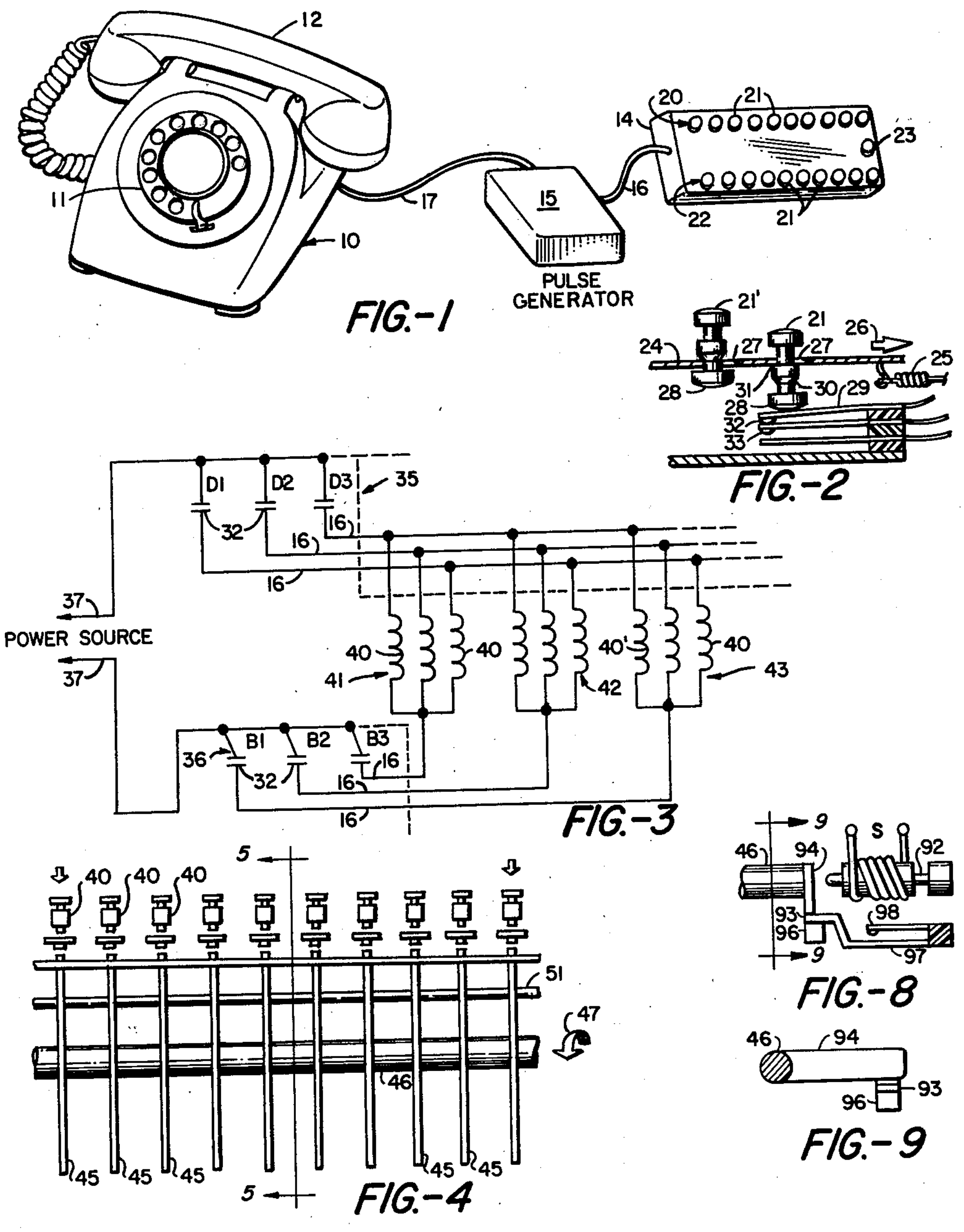
FIG. 1 is a view in perspective representing one particular arrangement of a telephone instrument, a selector mechanism and a pulse generator embodying a repertory dialing system in accordance with the present invention.
FIG. 2 is an elevational view, partly in section, illustrating the selector mechanism and the construction of the push buttons forming part of the selector mechanism.
FIG. 3 is a schematic diagram of a solenoid selector circuit for selecting a particular one of the coded disks included in the pulse generator.
FIG. 4 is an elevational view of a portion of the pulse generator of FIG. 1 showing one set of coded disks and the associated solenoids.
FIG. 8 is a diagram of a particular portion of the pulse generator of FIG. 6.
FIG. 9 is a sectional view of the portion shown in FIG. 8.

Referring now to the drawings, and particularly to FIG. 1, there is illustrated a telephone instrument 10 having a conventional manually operable dial 11 and a hand set 12. The repertory dialing apparatus of the invention includes a manually operable selector mechanism 14 and a pulse generator 15, illustrated schematically as a box and which will be more fully described hereinafter. The pulse generator 15, as shown in FIG. 4, includes a plurality of coded disks 45 and a solenoid 40 associated with each disk, controlled and energized from the selector mechanism 14. The selector mechanism 14 is preferably disposed near the telephone instrument 10 so that a desired subscriber can be called automatically while the handset is off the hook. On the other hand, although the pulse generator 15 is shown near the telephone in FIG. 1, it is more commonly located remotely from the telephone instrument, as for example adjacent the location where the telephone lines enter a building. The selector mechanism 14 is connected to the pulse generator 15 by a cable 16 which may have any desired length. The selector mechanism 14 need not be directly connected to the telephone instrument but is used adjacent thereto for controlling the automatic dialing of a call. The pulse generator 15 is provided with an output cable 17 which may be connected directly to the telephone instrument 10 as shown. Alternatively, the pulse generator 15 may be connected through the cable 17 to the telephone line terminals which are usually located in the basement of a house or on each floor of an office building.

The selector 14 is provided with two rows of push buttons 21. The lower row 22 of push buttons 21 may, for example, be used to select one particular coded disk in a bank of coded disks. In addition, there may be several banks of coded disks; hence, the upper row 20 of push buttons 21 may be used to select one of a plurality of disk banks. Accordingly, by selecting a particular bank and a particular disk position within a bank, a predetermined individual disk may be chosen out of a large plurality. This disk then accomplishes the transmission of a train of dial pulses to call the desired number in a manner to be presently described. The selector 14 is also provided with a clearance button 23 for releasing previously selected buttons at other stations, thereby permitting the use of the described system with a plurality of other telephones served by a single pulse generator.

The construction of the selector mechanism is shown in more detail in FIG. 2 to which reference is now made. The push buttons such as the button 21 extend through a movable retainer plate 24 which is urged by a spring 25 toward the right as shown by the arrow 26. The retainer plate 24 is provided with spaced apertures 27 through which the various push buttons extend. As shown, push button 21' is in its normal or disengaged position and is provided with an enlarged lower cylindrical portion 28 which prevents the push button from moving upward through the aperture 27. Each button is urged upwardly by a bias spring 29, part of the associated contact spring arrangement.

Joined to the enlarged cylindrical portion 28 is a cone-shaped portion 30 having its reduced end connected to the cylindrical portion 28. Accordingly, depressing the push button 21 forces the plate 24 towards the left in a direction opposite that of arrow 26, hence releasing any other previously depressed buttons. The upper shoulder 31 of the cone 30 now rests against the plate 24 and prevents the selected button 21 from moving upward under the force of its bias spring 29. In this position, which corresponds to that of button 21 in FIG. 2, the lower cylindrical portion 28 engages switch contacts 32. The switch contacts 32 control the solenoids 40 of FIG. 4, which, in turn, select the coded disks as will be more fully described hereinafter. Further depression of button 21 causes the motor control switch contacts 33 to close, energizing the pulse generator drive motor and initiating the cycle of automatic pulse transmitting.

The solenoid selector circuit of the pulse generator 15 of FIG. 1 is represented schematically in FIG. 3. The switch contacts 32 are illustrated here and, as explained above, are operated by the push buttons 21 of FIG. 2. The set 35 of switches 32 individually control one coded disk of each bank of disks while the set 36 of switches 32 individually select one bank of a plurality of switch banks. Leads 37 connect one terminal of each of the switches to a power source (not shown). The remaining terminal of each switch 32 is connected to a corresponding solenoid 40. For convenience there are shown three banks 41, 42, 43 of solenoids 40, there being three solenoids 40 in each bank. However, it is to be understood that there may be, for example, ten solenoids per bank and ten banks of solenoids, for a total of one hundred solenoids and a corresponding number of coded disks. A larger number of disks may readily be accommodated.

By closing, for example, the switch D3 of the disk selector set 35, and the switch B1 of the bank 36, a circuit may be closed from the power supply through the solenoid 40'. In a similar manner by proper actuation of two of the push buttons any desired solenoid in any one of the solenoid banks may be selected and energized.

It will be appreciated that, in accordance with an aspect of this invention, the described arrangement of the disk-associated solenoids 40 and the selector switches advantageously permits control of the pulse generating apparatus from a remote location. Thus the selector switches 32 may be disposed conveniently adjacent the telephone instrument while the solenoids 40 may be located at a considerable distance therefrom if desired, connection between the two being provided by the cable 16.

The construction of the coded disks and their associated mechanism will now be explained by reference to FIG. 4. Thus, a plurality of coded disks, such as the disks 45, is keyed to a shaft 46 which may be rotated in the direction of the arrow 47 by a motor (shown in FIG. 6). Although one coded disk bank is shown in FIG. 4, it is clear that additional banks of disks may be keyed to an extension of the shaft 46, all being driven together. The shaft 46 may if desired be driven by a synchronous motor through the intermediary of a gear train to assure the proper speed of rotation to generate the dial pulses at the appropriate rate.

Figure 5:
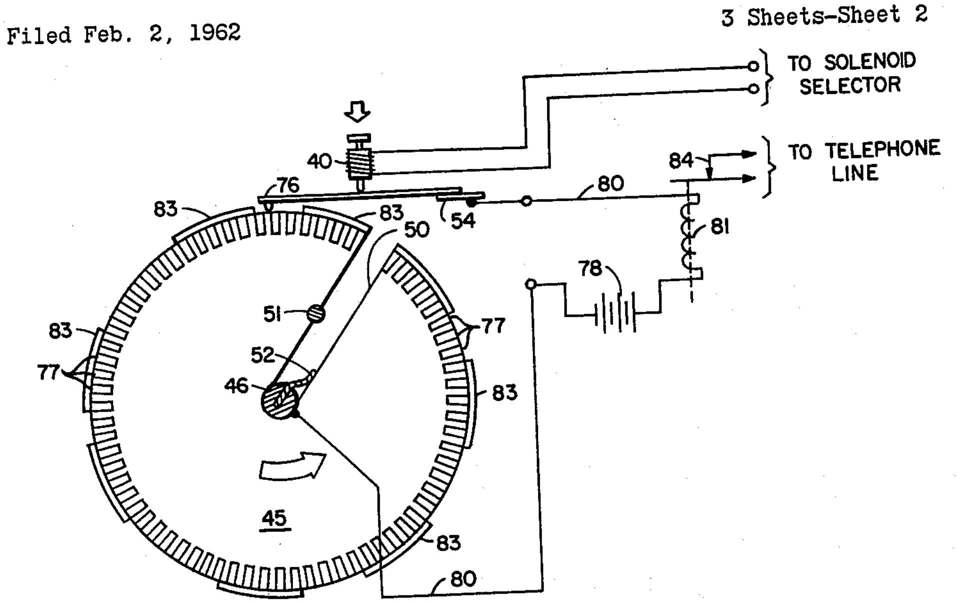
FIG. 5 is a sectional view, taken on line 5—5 of FIG. 4 and looking in the direction of the arrows, illustrating one of the coded disks and associated elements in a simplified dialing circuit.

A solenoid 40 is individually associated with each disk 45 as is clearly indicated in FIG. 4. The detailed construction of the coded disks 45 is illustrated particularly in FIG. 5 which is a sectional view of a portion of FIG. 4 shown in conjunction with a simplified telephone dialing circuit. The disk 45 is shown in FIG. 5 at a position during the operation of the pulse generator. As shown, the disk 45 consists of an electrically conductive material such as metal. The disk 45 may be mounted on the shaft 46, held in place by a retainer spring 52 and driven to rotate with the shaft 46 by a rod 51. This arrangement together with the slot 50 shown extending from the center to the periphery of the disk 45 permits the disk to be readily removed or placed in position so that other coded disks may be readily substituted. A disk follower 76 is mounted on a single bus bar 54 to which an external circuit connection is provided via a lead 80. The electrical circuit is completed by way of an interrupter solenoid 81, a power source such as the battery 78, and a second lead 80 which is connected to the shaft 46 as for example by way of a wiper arm (not shown). The follower 76 is normally displaced from the periphery of the disk 45 but is arranged to be moved into position to make electrical contact therewith by the energization of the solenoid 40 as it is selected by the solenoid selector circuit of FIG. 3. The solenoid 40, when energized, depresses the follower 76 to engage the disk 45. The coded disk 45 is provided with notches 77 which are regularly spaced about the periphery of the disk 45 and which are filled with an insulating material. Thus as the disk 45 is made to rotate while the follower 76 is in contact with its peripheral surface, a train of pulses is generated at regular intervals. These pulses periodically energize the interrupter solenoid 81 with the result that the associated relay contacts 84 are regularly opened and closed to interrupt the associated telephone line, the connection to which is indicated. The disk 45 is coded to develop a train of pulses corresponding to a particular subscriber's call number with the addition of strips 83 of insulating material about the periphery of the disk 45 suitably disposed to define the appropriate digits and to provide suitable inter-digital intervals. The strips 83 of insulating material may be applied at positions which can be readily determined by counting the number of notches 77, beginning with the origin of the disk 45 (the slot 50). This insulating material may be an adhesive plastic or may even be fingernail polish which can be easily applied by the individual subscriber to make up any desired combination of digits corresponding to a particular telephone number. It will be clear from the circuit of FIG. 5 that when the disk 45 is in its rest position, i.e., with the follower 76 opposite the slot 50, the solenoid 81 is de-energized and the relay contacts 84 are closed. Thus for all situations except when the pulse generator circuit is being used for automatically dialing a particular telephone number corresponding to a selected coded disk 45, the telephone line circuit is under the control of the telephone instrument.

Figure 6:
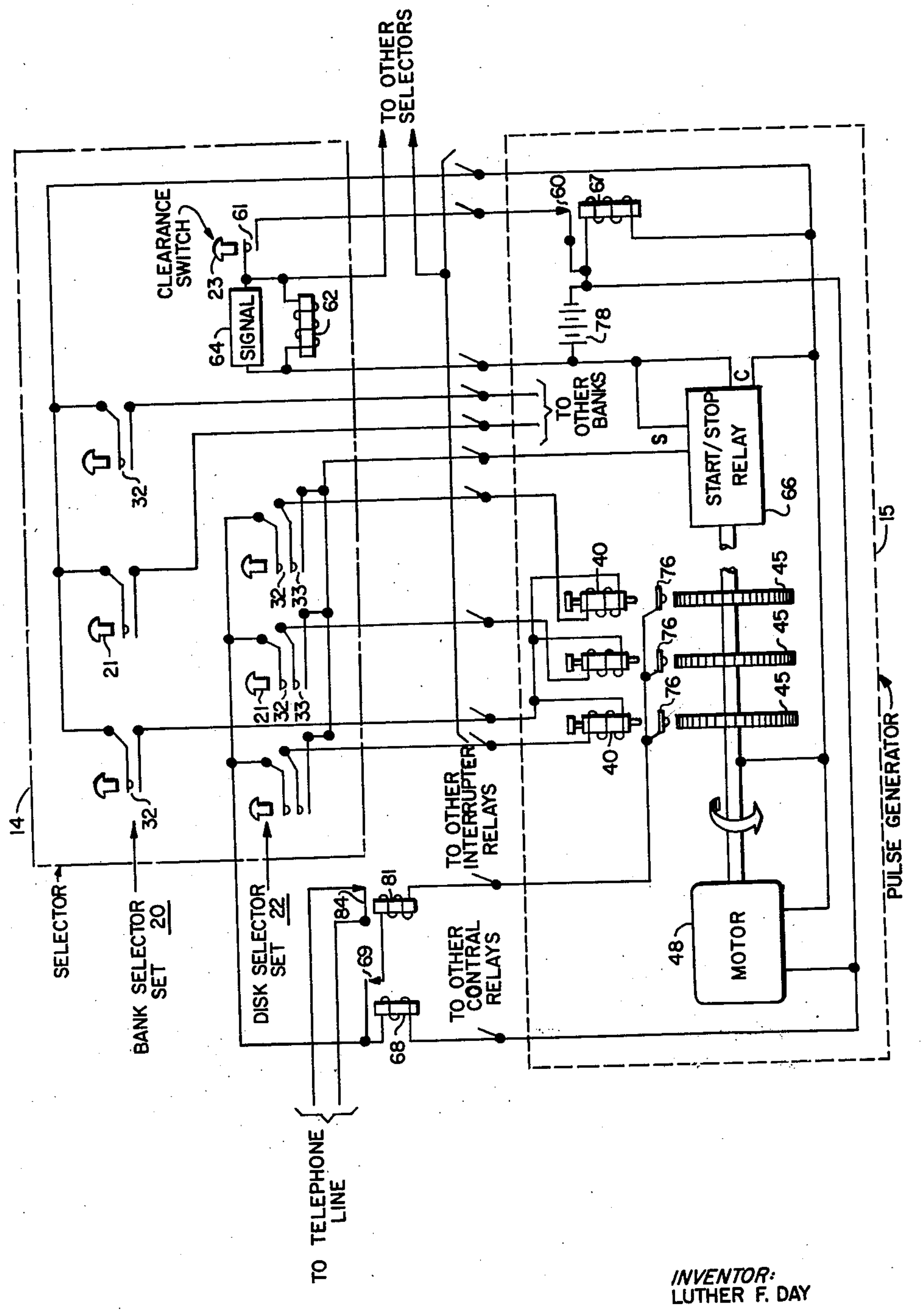
FIG. 6 is a schematic representation of one particular arrangement of a repertory dialing system in accordance with the invention.

A more comprehensive exemplary arrangement in accordance with the invention is represented schematically in FIG. 6. A selector 14 and a pulse generator 15 are shown in FIG. 6 together with appropriate interconnections and associated apparatus sufficient to provide a multiple automatic repertory dialing system in accordance with the invention. Within the selector portion 14 outlined by a dot-dash line are shown a plurality of push buttons 21 arranged in a bank selector set 20 and a disk selector set 22. As described in connection with FIG. 3, the associated contacts 32 may provide a circuit for energizing a particular one of the solenoids 40 in the pulse generator portion 15, outlined by the broken line. The arrangement of the pushbutton switches 21 is similar to that described in connection with FIG. 2, except that the start contacts 33 are omitted from the bank selector set 20 as being unnecessary in view of the provision thereof in the disk selector set 22. In FIG. 6 a clearance solenoid 62 is shown controlled by the switch contacts 61 associated with the clearance button 23 for releasing the movable retainer plate 24 (FIG. 2) when energized. A signaling device 64 which may provide an audible or visible signal or both, as desired, is connected in parallel with the solenoid 62 to provide a momentary signal whenever the solenoid 62 is energized.

The pulse generator 15 is shown including a motor 48 for driving the coded disks 45 as already described. The motor 48 together with the related circuitry is controlled by a start/stop relay 66 represented by a block in FIG. 6 having solenoid leads S and contact leads C. The start/stop relay 66 is shown in greater detail in FIGS. 8 and 9. A clearance lockout relay 67 is shown within the pulse generator 15 having contacts 60 in circuit with the contacts 61 of the clearance switch of the selector 14. Also shown in FIG. 6 is an interrupter relay 81 with contacts 84 connected in circuit with the telephone instrument and a control relay 68 having contacts 69 for controlling the energizing circuit of the relay 81.

In accordance with the invention as represented in FIG. 6, a single pulse generator 15 may be associated with a large number of individual selector units 14 to provide repertory dialing service for a multiplicity of subscribers on different telephone lines. An interrupter relay 81 and associated control relay 68 are provided for each telephone line served by the repertory dialing system. A selector unit 14 may be provided for each telephone instrument including one or more extension telephones served by a given line. All that is required is that connections may be made from the telephone line and associated selector units 14 to some central point at which the pulse generator 15 may be conveniently located. Thus the arrangement is appropriate for office and apartment buildings in which the occupants desire the service provided by this system. In addition to supplementing conventional telephone service by providing repertory dialing for residential and office subscribers, the telephone system of the present invention may readily be employed to provide a type of service which is not presently available. The use of one or more pulse generator units and a suitable number of selector units and related apparatus in accordance with the present invention in conjunction with a plurality of telephone instruments without dials advantageously serves to provide a system which permits free and unlimited calls to be made to any of a predetermined group of telephone subscribers without the need for additional circuitry or other special arrangements to limit the calls within the group. Such a system might find particular utility at an airport facility, for example, where it is desirable to provide telephones from which the public can call, free of charge, any one or more of the local hotels, taxicab services, airline ticket desks and the like, without charge and without the necessity of looking up a particular telephone number in a large and cumbersome directory. The names of the various subscribers accessible to the user of such a system could be conveniently printed on the individual selector units so that a particular subscriber might be called simply by selecting the corresponding coded means in accordance with the invention.

It should be understood, however, that a simplified arrangement of the system of the present invention may also be utilized on an individual subscriber basis, if desired, by employing the circuit arrangements of FIGS. 3 and 5 together with the drive mechanism shown in the pulse generator 15 of FIG. 6. Thus the invention provides an extremely versatile but simple and reliable system for automatic repertory dialing which is feasible for a single telephone subscriber or for use on a partial common equipment basis to serve a large number of subscribers interconnected through common terminal equipment.

It will be clear that the pulse generator 15 of FIG. 6 is not limited to the particular number of coded dial disks and associated equipment shown in conjunction therewith. As therein represented, the coded disks 45 and selector solenoids 40 are a part of the same disk bank. An individual disk bank may be extended to include a considerably larger number of disks 45 and correspondingly a multiplicity of banks may be arranged within a single pulse generator 15. For example, the system may be arranged to store several thousand coded disks and an individual selector unit may, if desired, be provided access to several hundred of these disks.

In the operation of the automatic repertory dialing system of the invention as represented schematically in FIG. 6, a simple general procedure may be followed. As usual, a subscriber lifts the handset of his telephone instrument and listens for a dial tone. He then presses his clearance button 23 and observes the signaling device 64 to determine if the pulse generator is in use. Pressing the clearance button 23 closes the contacts 61 to energize both the signaling device 64 and the clearance solenoid 62 from the power source 78 via the normally closed contacts 60. If, however, the pulse generator 15 is in use by another subscriber, the clearance lockout relay 67 is energized and the contacts 60 are open. Thus it will be seen that the absence of a signal from the signaling device 64 indicates that the pulse generator is in use and that the subscriber should wait a few seconds and try again. In this condition the solenoid 62 in the selector mechanisms of other subscribers is prevented from clearing the selector buttons therein while the pulse generator is being used.

If a signal is received from the signaling device 64 in response to pressing the clearance button 23, the subscriber is free to proceed. In this case, the clearance solenoids 62 of all of the selector units 14 will have been energized to release any previously selected buttons 21. The subscriber then presses the appropriate buttons in the bank selector set 20 and the disk set selector 22 corresponding to the subscriber to be called. Pressing the particular button 21 of the disk selector set 22 all the way down closes the start contacts 33 and initiates the automatic dialing sequence. The start/stop relay 66 and the individual subscriber's control relay 68 are energized in series via the contacts 32 and 33 of the operated pushbutton 21 in the disk selector set 22, completing a circuit across the battery 78. The contacts of the start/stop relay 66 then energize the motor 48, the clearance lockout relay 67, and the selected solenoid 40 via the contacts 32 of the operated pushbuttons 21 in the bank selector set 20 and the disk selector 22. The corresponding follower 76 is moved by the energized solenoid 40 to engage the coded disk 45 as the latter is rotated through one revolution by the motor 48. The control relay 68 remains energized under the control of the contacts of the start/stop relay 66. The closure of the contacts 69 places the individual interrupter relay 81 corresponding to the user under the control of the selected follower 76 and coded disk 45 so that the appropriate dial pulses are applied to the user's telephone line by way of the interrupter contact 84. The full train of dial pulses corresponding to the selected number is then rapidly and accurately generated and applied to the user's telephone line, after which the motor 48 is de-energized by the start/stop relay 66 in a manner to be described and the entire circuit is returned to the quiescent condition. The calling subscriber then waits for call completion while the pulse generator is free to be used by other associated subscribers.

It should be noted that the above described operating procedure may be shortened in case the user happens to be the last subscriber to make use of the pulse generator 15 for dialing a call. This situation can be ascertained by noting the position of the bank and disk selector buttons before pressing the clearance button 23. If any of the buttons 21 are in their operated position, it indicates that no clearance button 23 of any selector 14 has been operated and thus that the system is not presently in use. In such a case the subscriber may proceed directly to operate the appropriate buttons 21 to select a desired telephone number.

One particular arrangement of a start/stop relay 66 for providing suitable operation in accordance with the invention is shown in FIGS. 8 and 9 which are side and end-sectional views thereof respectively. As shown a blade 94 is attached to, and arranged to rotate with, the motor shaft 46. In its rest position the blade 94 directs the end 93 of a flexible spring 97 against a rigid block 96, holding open the contacts provided between the springs 97 and 98. This arrangement advantageously serves to arrest the rotation of the motor shaft 46 at a precise point each time a cycle of operation is completed. Energization of the solenoid 92 pushes the outer end of the blade 94 off the end 93 of the spring 97, thus permitting the contacts between the springs 97 and 98 to close and energize the drive motor which thereupon rotates the shaft 46 and the blade 94. The contacts between the springs 97, 98 remain closed through a complete revolution of the motor shaft 46, after which the blade 94 again engages the end 93, opening the switch contacts and arresting the rotation of the shaft 46 upon contact with the rigid block 96.

Figure 7:
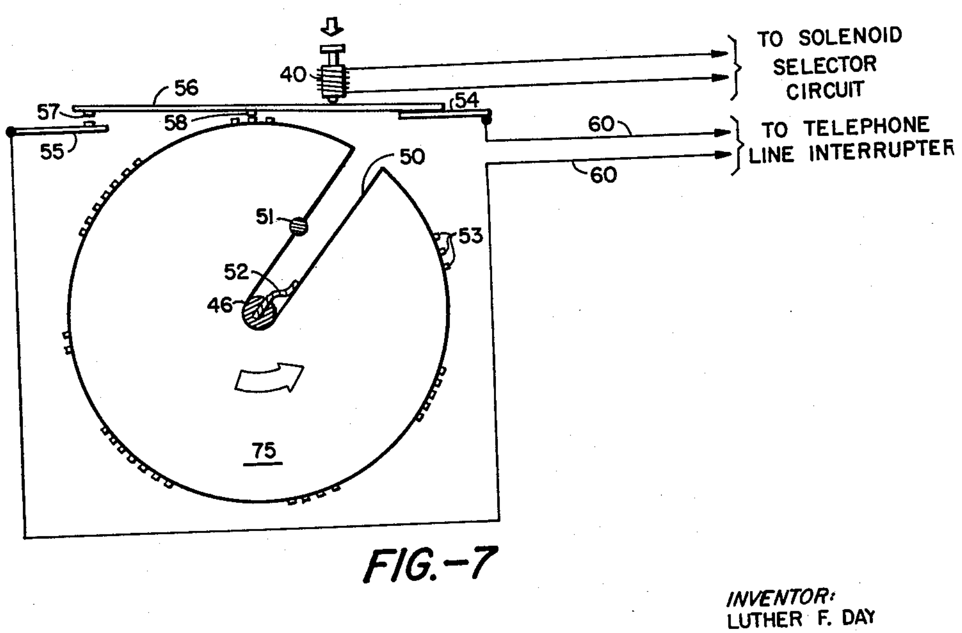
FIG. 7 is a representation of an alternative arrangement which may be employed in the apparatus of FIG. 4.

An alternative disk and follower arrangement which may be employed in connection with the present invention is shown in FIG. 7. In FIG. 7 a disk 75 is shown having a mounting mechanism similar to that shown for FIG. 5. The circumference of each coded disk 75 is provided with projections or teeth such as 53 arranged in groups corresponding to coded digits of a particular number. The spacing between adjacent groups is arranged to provide inter-digital intervals corresponding to those available during normal operation of the conventional dial telephone. Thus, as shown, the disk 75 of FIG. 7 has groups of teeth arranged in a clockwise direction corresponding to the number 3547273. While a seven-digit number is shown, such being suitable in most local telephone systems, it will be appreciated that additional digits may be provided as desired about the periphery of a disk such as the disks 74 or 45 (FIG. 5). For example, these disks can readily accommodate groups of ten digits to make them adaptable to dial any number in the United States. Associated with the disk 75 is a follower 56, shown in the momentarily opened position between a pair of bus bars 54 and 55. When the follower 56 is moved into position by an associated selector solenoid 40 to complete a circuit between the bus bars 54 and 55 via the contacts 57, a follower lobe 58 is in position to periodically interrupt the circuit at the contact 57 in correspondence with the projections 53 as the disk 75 is rotated through one revolution. The circuit shown in FIG. 7 may be connected to a telephone line interrupter such as the relay 81 shown in FIGS. 5 and 6 via the leads 60. When the arrangement of FIG. 7 is employed, the coded disks may be made of any suitable metal or plastic material since it is not essential that the disks 75 be electrically conducting. Preferably the disks 75 are stamped or punched out with the proper combination of teeth 53. Alternatively, a disk may be provided with a full complement of teeth so that the customer may cut off unwanted teeth to create any desired combination of coded numbers.

There has thus been disclosed a multiple repertory dialing apparatus which reliably provides for the automatic generation of dial pulses corresponding to a selected subscriber's number by a pulse generator which may be located and controlled remotely from any number of subscriber's telephone instruments. All that needs be positioned near individual subscriber's instrument is a selector mechanism which takes up very little space. The apparatus of the invention is equally adapted to operate in conjunction with a single subscriber's telephone installation having one or more extension telephone instruments or with a multiplicity of subscriber telephone lines which are to be provided repertory dialing service from a single automatic pulse generator. It may also be employed to permit free telephone calls to a predetermined group of subscribers anywhere in the local telephone system without the need for additional equipment otherwise needed to monitor or limit such service. The coded disks may be easily encoded by the subscriber and are readily replaced. Despite its versatility, the repertory dialing apparatus of the invention is inexpensive to manufacture and simple and reliable in operation. The coded disks may even be distributed by merchants who may wish to have their call number on their customer's repertory. There is almost no limitation to the number of coded disks that can be used and selected in that it is always possible to add additional banks of coded disks if desired.

Although there have been described above specific arrangements of a repertory dialing system in accordance with the invention for the purpose of illustrating the manner in which the invention may be used to advantage, it will be appreciated that the invention is not limited thereto. Accordingly any and all modifications, variations or equivalent arrangements falling within the scope of the annexed claims should be considered to be a part of the invention.

What is claimed is:

1. In an automatic dial telephone system having a plurality of telephone instruments and telephone line circuits, a repertory dialing apparatus including a single selectively operable dial pulse generator having a plurality of coded means, each being adapted to generate a set of dial pulses corresponding respectively to the call numbers of particular subscribers, a plurality of manually operable means respectively located near individual telephone instruments and coupled to share the pulse generator and the coded means on a common access basis, means responsive to the setting of a particular manually operable means for selecting a desired one of the coded means to generate a set of dial pulses corresponding to the call number of a desired subscriber, and means including a circuit interrupter unique to each line circuit for directing the generated dial pulses only to the telephone line circuit corresponding to the particular manually operable means.

2. A repertory dialing apparatus for use on an automatic dialing telephone system including a plurality of individual subscriber telephone instruments and telephone lines, the apparatus comprising a dial pulse generator connected for common use with the plurality of telephone instruments, a selector mechanism individually associated with each telephone instrument for controlling the dial pulse generator to provide a preselected sequence of dial pulses, and a plurality of means each being unique to a corresponding telephone line and individually controllable by the pulse generator for applying the preselected sequence of dial pulses only to the telephone line corresponding to the selector mechanism which has determined the sequence of dial pulses.

3. A repertory dialing apparatus for use with an automatic dialing telephone system including a plurality of individual subscriber telephone instruments and telephone lines, the apparatus comprising a plurality of telephone line interrupters individually in circuit with corresponding ones of the telephone lines, remotely controlled pulse generating means commonly shared by each individual subscriber telephone instrument for controlling a selected telephone line interrupter only, and means associated with each individual subscriber telephone instrument for causing the pulse generating means to produce a series of dial pulses in accordance with a selected subscriber number.

4. A repertory dialing apparatus for use with an automatic dialing telephone system including a plurality of individual subscriber telephone instruments and telephone lines, the apparatus comprising a dial pulse generator connected for common use with the plurality of telephone instruments, a plurality of circuit interrupters each individually associated with a corresponding telephone line and responsive to pulses from the dial pulse generator, means individually associated with each telephone instrument for selecting a particular sequence of dial pulses to be generated and for energizing only the circuit interrupter at the corresponding telephone line in response thereto, signaling means for indicating when the dial pulse generator is not in use, and means for disabling the signaling means during the time that the dial pulse generator is in use.

5. A repertory dialing apparatus for use with an automatic dialing telephone system including a plurality of individual subscriber telephone instruments and associated telephone lines, the apparatus comprising a dial pulse generator connected for common use with the plurality of telephone instruments, a selector mechanism individually associated with each telephone instrument for controlling the dial pulse generator for providing a preselected sequence of dial pulses, means individually associated with each telephone line and controllable one at a time by the pulse generator for applying the preselected sequence of dial pulses to a selected telephone line only, means for driving the dial pulse generator through a particular sequence, and means for initiating the operation of the driving means and for stopping the driving means at a particular position upon the completion of the dial pulse sequence.

6. A repertory dialing apparatus for use in conjunction with an automatic dialing telephone system having a plurality of telephone lines and telephone instruments comprising a number of coded means corresponding to individual telephone numbers, a solenoid individually associated with each of the coded means, said coded means and solenoids being commonly connected to said plurality of lines, means for remotely controlling the solenoids to select a desired one of the coded means, an interrupter individually in circuit with each telephone line, and means for controlling a predetermined interrupter on an exclusive selection basis in response to pulses generated by the selected coded means.

7. Apparatus for automatically dialing a preselected subscriber's number in conjunction with an automatic dialing telephone system including a single pulse generator and a plurality of selector mechanisms coupled thereto, means for selectively coupling the pulse generator to one of a number of telephone lines, the pulse generator including coded dial pulse means shared in common with all of said telephone lines, follower means individually engageable with the coded dial pulse means, remotely controlled means for moving a selected follower means into engagement with its associated dial pulse means, switch means within each selector mechanism for energizing a predetermined one of the remotely controlled means, and means for moving the coded dial pulse means through a complete cycle to generate a series of dial pulses corresponding to a predetermined subscriber number.

8. Apparatus in accordance with claim 7 wherein the means for selectively coupling the pulse generator to one of a number of telephone lines comprises an interrupter in circuit with the telephone line and responsive to pulses from the pulse generator.

9. Apparatus in accordance with claim 8 wherein the coded dial pulse means comprise a plurality of rotatable disks having projections arranged about the periphery theretof in accordance with the respective digits of designated telephone numbers.

10. A repertory dialing apparatus for an automatic dial telephone system having at least one telephone instrument and a telephone line circuit, the apparatus including a pulse generator having a plurality of coded means, each coded means being adapted to generate a set of dial pulses in accordance with the telephone number of a corresponding subscriber, means including a solenoid associated with each of the coded means for coupling a selected one of the coded means to the telephone line circuit, motor means for driving the coded means in unison, the pulse generator being adapted to be disposed remote from the telephone instrument, a selector mechanism disposed near the telephone instrument and coupled to the pulse generator, the selector mechanism including a plurality of manually operable selector push buttons for energizing a selected one of the solenoids, control means associated with the push buttons for starting the motor means to drive the coded means, retainer means for holding selected push buttons in an operated position, clearance means for disengaging the retainer means, and clearance lockout means for disabling the clearance means while the pulse generator is operating.

11. A repertory dialing apparatus for an automatic dial telephone system having at least one telephone instrument and a telephone line circuit, said apparatus including a pulse generator having a plurality of coded means, each coded means being adapted to generate a set of dial pulses in accordance with the telephone number of a corresponding subscriber, means including a solenoid associated with each of the coded means for coupling a selected one of the coded means to the telephone line circuit, motor means for driving the coded means in unison, the pulse generator being adapted to be disposed remote from the telephone instrument, a selector mechanism disposed near the telephone instrument and coupled to the pulse generator, the selector mechanism including a plurality of manually operable selector push buttons for energizing a selected one of the solenoids, control means associated with the push buttons for starting the motor means to drive the coded means, retainer means for holding selected push buttons in an operated position, clearance means for disengaging the retainer means, clearance lockout means for disabling the clearance means while the pulse generator is operating, and signaling means coupled to the clearance means for indicating when the pulse generator is operating.

12. A repertory dialing apparatus for an automatic dial telephone system having at least one telephone instrument and a telephone line circuit, the apparatus including a pulse generator having a plurality of coded discs, each coded disc being adapted to generate a set of dial pulses in accordance with the telephone number of a corresponding subscriber, means including a solenoid associated with each of said coded disks for selecting a predetermined disk, motor means for rotating the coded disks in unison, the pulse generator being adapted to be disposed remote from the telephone instrument and operable with a plurality of telephone line circuits, a selector mechanism disposed near the telephone instrument and coupled to the pulse generator, the selector mechanism including a plurality of manually operable push buttons for energizing a selected one of the solenoids and for starting the motor means to rotate said coded disks, and means for coupling the pulse generator to a selected telephone line circuit and for enabling the set of dial pulses to be transmitted thereto.

13. In an automatic dial telephone system having a plurality of telephone instruments and telephone lines, an arrangement for permitting the automatic dialing of any one of a predetermined group of telephone numbers by interrupting the circuit of any one and one only of said lines comprising a remotely located dial pulse generator having a plurality of means coded in accordance with the predetermined numbers, the coded means being shared in common by each of the telephone instruments, means operable by an individual telephone user for remotely selecting a particular one of the coded means, means within the dial pulse generator for producing dial pulses in accordance with the telephone number of the selected coded means, and means individually and exclusively controllable by the dial pulse generator for applying the pulses to only that telephone line circuit associated with the individual user operating the selecting means.

14. In an automatic dial telephone system having a plurality of telephone instruments and telephone lines, apparatus for permitting the automatic dialing of particular telephone numbers within a predetermined group from a particular telephone instrument comprising a selectively operable dial pulse generator having a plurality of coded means and adapted to generate sets of dial pulses corresponding respectively to the call numbers of the predetermined group, any one of the coded means being selectively connectible to control any one of the telephone lines, the pulse generator being adapted to be located remote from a telephone instrument, manually operable selector means located near a telephone instrument and coupled to the pulse generator for selecting a particular one of the coded means, a telephone circuit interrupter individually associated with each telephone line and responsive to the selected coded means, and means responsive to the pulse generator and the selecting means for energizing only a particular line circuit interrupter in response to the generated dial pulses.

15. Apparatus for automatically dialing a preselected subscriber's number in conjunction with an automatic dialing telephone system including a single pulse generator and a plurality of selector mechanisms coupled thereto; means for selectively coupling the pulse generator to one of a number of telephone lines comprising an interrupter in circuit with the telephone line and responsive to pulses from the pulse generator; the pulse generator including coded dial pulse means commonly accessible to all of the telephone lines and comprising a plurality of rotatable disks fabricated of an electrically conducting material and having a series of slots spaced about the periphery thereof, the slots being filled with an insulating material, and a number of insulating strips spaced about the periphery of the disks to define the digits comprising the corresponding telephone numbers; follower means individually engageable with the coded dial pulse means; remotely controlled means for moving a selected follower means into engagement with its associated dial pulse means; switch means within each selector mechanism for energizing a predetermined one of the remotely controlled means; and means for moving the coded dial pulse means through a complete cycle to generate a series of dial pulses corresponding to a predetermined subscriber number.

16. A repertory dialing apparatus for use in conjunction with an automatic dialing telephone system having a plurality of individual telephone instruments and telephone lines comprising a plurality of coded means corresponding to individual telephone subscriber designations, a signal generating means responsive to the coded means, the coded means and the signal generating means being commonly accessible to each individual telephone instrument, a selector individually associated with each telephone instrument for selecting a predetermined coded means, and means including a circuit interrupter unique to each telephone line and individually controllable by the signal generating means for applying signals in accordance with the preselected coded means to only a predetermined one of the telephone lines.

17. A repertory dialing apparatus in accordance with claim 16 wherein the signal generating means comprises a dial pulse generator, and the signal applying means comprises means for completing a circuit between the dial pulse generator and only that circuit interrupter coupled to said predetermined telephone line.

References Cited in the file of this patent

UNITED STATES PATENTS

| | | |
|---|---|---|
| Re. 23,089 | Bellamy | Mar. 15, 1949 |
| 2,088,002 | Scott | July 27, 1937 |
| 2,183,713 | Field | Dec. 19, 1939 |
| 2,329,466 | Goff | Sept. 14, 1943 |
| 2,348,758 | Samburg et al. | May 16, 1944 |
| 2,919,310 | Oden et al. | Dec. 29, 1959 |
| 2,941,043 | Ham et al. | June 14, 1960 |
| 2,951,908 | Malthaner et al. | Sept. 6, 1960 |
| 3,021,392 | Wrede et al. | Feb. 13, 1962 |